(12) United States Patent
Deolalikar et al.

(10) Patent No.: US 10,817,496 B2
(45) Date of Patent: Oct. 27, 2020

(54) FORUM INSPECTION BASED ON CORRELATION RATING OF RESPONSE POSTER

(71) Applicant: HEWLETT PACKARD ENTERPRISE DEVELOPMENT LP, Houston, TX (US)

(72) Inventors: Vinay Deolalikar, Sunnyvale, CA (US); Hernan Laffitte, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 742 days.

(21) Appl. No.: 15/033,577

(22) PCT Filed: Nov. 5, 2013

(86) PCT No.: PCT/US2013/068546
§ 371 (c)(1),
(2) Date: Apr. 29, 2016

(87) PCT Pub. No.: WO2015/069222
PCT Pub. Date: May 14, 2015

(65) Prior Publication Data
US 2016/0253368 A1 Sep. 1, 2016

(51) Int. Cl.
*G06F 7/00* (2006.01)
*G06F 16/23* (2019.01)
(Continued)

(52) U.S. Cl.
CPC ............ *G06F 16/23* (2019.01); *G06F 16/285* (2019.01); *G06N 20/00* (2019.01); *G06Q 10/107* (2013.01); *G06Q 50/01* (2013.01); *H04L 51/16* (2013.01)

(58) Field of Classification Search
CPC .................................................. G06F 16/285
See application file for complete search history.

(56) References Cited

U.S. PATENT DOCUMENTS 7,302,397 B1 11/2007 Hein et al.
8,407,072 B2 3/2013 Cala et al.
(Continued)

FOREIGN PATENT DOCUMENTS

KR 1020100134999 A 12/2010
WO WO-2007041459 A2 5/2009

OTHER PUBLICATIONS

DeviceLock, Inc. "DeviceLock Technical Support Guide.", Jul. 27, 2009, 11 pages.
(Continued)

*Primary Examiner* — Eliyah S. Harper
(74) *Attorney, Agent, or Firm* — Hewlett Packard Enterprise Patent Department

(57) ABSTRACT

In one implementation, a poster engine may maintain a thread history associated with a response poster, a status engine may maintain a potential thread status of a thread of a forum based on the thread history, and a pool engine may maintain an inspection pool based on the potential thread status. In another implementation, a thread status of a thread of the forum may be maintained based on a correlation rating of a response poster and a pool having a number of threads based on the thread status may be provided.

15 Claims, 5 Drawing Sheets

(51) Int. Cl.
*G06N 20/00* (2019.01)
*G06F 16/28* (2019.01)
*G06Q 50/00* (2012.01)
*G06Q 10/10* (2012.01)
*H04L 12/58* (2006.01)

(56) References Cited

U.S. PATENT DOCUMENTS

| | | | |
|---|---|---|---|
| 9,740,785 B1* | 8/2017 | Robinson | G06F 16/9535 |
| 9,740,786 B1* | 8/2017 | Gaw | G06F 16/951 |
| 2007/0226205 A1* | 9/2007 | Carrer | G06F 16/951 |
| 2008/0005234 A1* | 1/2008 | Newnam Giardino | G06Q 10/10 709/204 |
| 2008/0040427 A1 | 2/2008 | Shroff et al. | |
| 2008/0301091 A1* | 12/2008 | Hibbets | G06F 16/24578 |
| 2009/0030940 A1* | 1/2009 | Brezina | H04L 51/36 |
| 2009/0327237 A1* | 12/2009 | Zhang | G06F 16/951 |
| 2010/0217804 A1* | 8/2010 | Carrer | G06Q 10/10 709/206 |
| 2010/0246797 A1 | 9/2010 | Chavez et al. | |
| 2010/0293560 A1* | 11/2010 | Bland | H04L 51/14 719/328 |
| 2013/0006973 A1* | 1/2013 | Caldwell | G06F 16/345 707/723 |
| 2013/0173333 A1 | 7/2013 | Zhang et al. | |
| 2014/0143680 A1* | 5/2014 | Angarita | G06F 16/137 715/751 |
| 2014/0214833 A1* | 7/2014 | Ozonat | G06F 16/355 707/737 |

OTHER PUBLICATIONS

ISR/WO, PCT/US/2013/068546, filed Nov. 5, 2013—12 pg dated Aug. 30, 2014.

* cited by examiner

FORUM INSPECTION BASED ON CORRELATION RATING OF RESPONSE POSTER

BACKGROUND

Forums are commonly used as discussion boards for posters to ask questions and respond with answers. Discussion boards may provide public and/or private discussions. For example, asynchronous discussion forums may be used by a corporation to allow corporate experts to discuss a solution to a problem before providing an answer to a customer. Forums may be scalable based on community of the forum and available resources. Forums may become very large and contain hundreds or thousands of threads.

DETAILED DESCRIPTION

Figure 2:
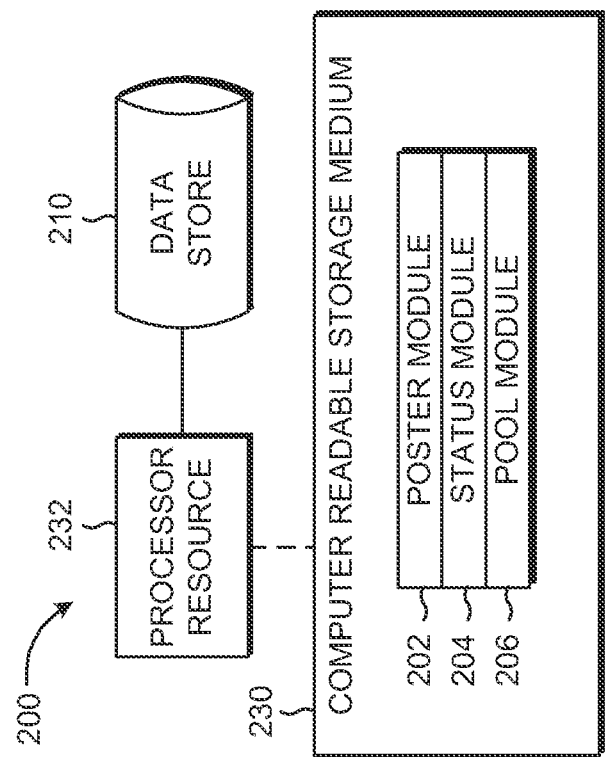
FIGS. 1 and 2 are block diagrams depicting example systems for inspecting a forum.

In the following description and figures, some example implementations of systems and/or methods for inspecting a forum are described. Some examples are described specifically for use with asynchronous discussion forums. However, it should be noted that examples of inspecting a forum described herein may be utilized in a variety of appropriate systems and applications. In particular, a system for inspecting a forum may inspect a forum that allows for posts to be made in response to a thread. Therefore, asynchronous discussion forums are merely potential uses of the systems and methods for inspecting a forum. Thus any reference to elements and/or methods specific to asynchronous discussion forums is included to provide context for specific examples described herein unless otherwise indicated.

A forum may be any appropriate grouping of communication. For example, a forum may include multiple discussions and/or groups of discussions. A forum may be community-based and contain a discussion thread for members of the community to contribute to a topic. For example, a community message board may include multiple threads, where each thread may cover a different topic. A thread may be a collection of postings made by member of a community. A post may be any appropriate form of a publishable message. A thread may be initiated or associated with a source post or original post, which may be the first post of a discussion. The member who creates a post may be deemed a poster. For example, a first member who posts the original post may be the original poster of a thread and a second member who responds to the original post may be a response poster. Asynchronous discussion forums are a form of community-based communication that allows members to communicate at their convenience. Asynchronous discussion forums allow for a thread to be posted and a member may respond to the thread at a different time. An asynchronous discussion forum may be publically available, private, or a combination thereof. For example, a customer may provide a question over a website feedback mechanism and the question may be posted on an internal corporate discussion forum for review by experts. In that example, a response may be sent to the customer once a solution is determined by the experts.

One example difficulty associated with forums is a status determination of a thread once the thread is posted. A contributor, or poster, may find it difficult to respond to each thread or determine an importance, priority, or other status of a thread. For example, an emergency response team may be assembled to respond to urgent threads, but it may be difficult to determine whether a thread should be answered by the emergency response team or set aside for another team to answer low priority threads. The difficulty may arise from deriving status based on the context of the original post of the thread. For example, a post may be marked with a status after review that may be entirely different than the status of a similar and/or related post. Machine-learning techniques may also have difficulty differentiating between a thread that should have a first status versus a thread that should have a second status. For example, methods of studying forum metadata, mining the text of forum content using clustering techniques, and cross-correlating the results from the metadata and mining using supervised learning may result in statistical profiles of the threads that are not sufficiently distinct. For further example, status marking using Bayesian machine learning may be unable to determine whether a thread is important, difficult, or other status that may encompass a state of urgency based on the words of the original post.

Various examples described below relate to inspecting a forum based on a correlation rating of a response poster. A response poster may be the writer, owner, or other designation associated with a reply or a response to the original post. By correlating a response poster with a status, a thread may be given a status associated with the response poster. The difficulties in applying a status to a thread based on context may be avoided and replaced with objective measurement based on contributors' responses to the thread rather than the context of the original post and/or original poster.

Figure 1:
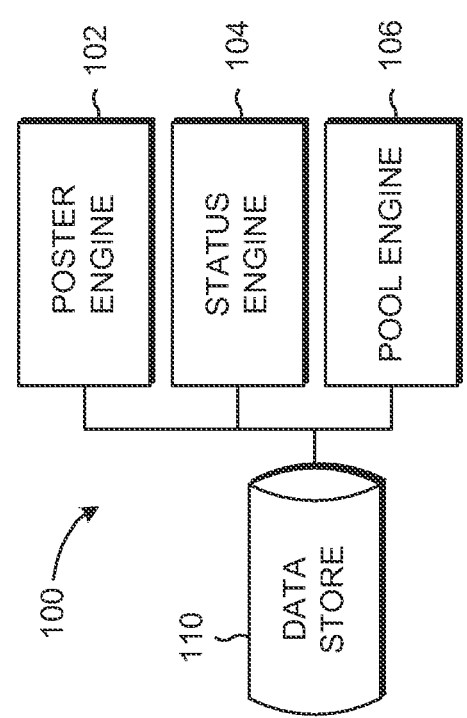

FIGS. 1 and 2 are block diagrams depicting example systems for inspecting a forum. Referring to FIG. 1, an example system 100 for inspecting a forum may generally comprise a poster engine 102, a status engine 104, and a pool engine 106. The example system 100 may also include a data store 110. The terms "including," "having," and variations thereof, as used herein, have the same meaning as the term "comprising" or appropriate variation thereof.

The poster engine 102 may represent any combination of circuitry and executable instructions configured to maintain a set of data associated with a response poster. For example, the poster engine 102 may maintain a thread history. The thread history may include any appropriate action associated with a forum that that may be correlated to a response poster. For example, the thread history may include data related to a forum of which the response poster is a member or data related to a forum and/or a thread having a response post associated with the response poster.

The poster engine 102 may maintain a correlation rating of a response poster. The correlation rating may represent the degree of correlation between a response poster and a status. For example, a response poster may have a strong correlation with important posts. A status may be any label, category, or value that may be applied to a thread and/or a response poster. Examples of a status label and/or status category may include urgent, non-urgent, important, technical, accurate, interesting, any other word or phrase capable of categorizing or labeling a thread or a response poster. An example value that may represent a status may include a ratio, percentage, or other number capable of representing a status. A status may also include a degree or level of the status. Examples of degrees of a status and/or correlation ratings may include low, high, strong, medium, or the like. Other examples of degrees of a status may include a number representation such as a ratio or a percentage. The degree of correlation may also be described in any of the above ways.

The poster engine 102 may maintain the correlation rating based on a thread history. The correlation rating may be reflective of the attribute, reputation, or other status associated with the response poster. For example, a first response poster that has responded to a number of technical questions may be associated with a technical expert status and a second poster that has responded to a number of sales questions may be associated with a customer care expert status. The thread history may contain information to determine a correlation rating. For example, a thread history may include information associated with a number of threads having a response post associated with the response poster A response poster may be directly associated with a post and/or thread by being the writer of the message or directly interacting with the thread. In addition or alternatively, a respond poster may be indirectly associated with a post or a thread, such as by association with other contributors or posts associated with the thread that are not in direct response to an original post. A status may be directly or indirectly associated with a post by associating a first thread with a second thread having the status. For example, a thread may be split into two questions, and the first thread may be labeled with the status of the second thread once the status of the second thread is determined.

A frequency table may be used to maintain the correlation rating of the response poster. For example, the frequency table may include a column to contain a number of threads having a response post made by the response poster associated with a status. For another example, the frequency table may include a first column to contain a total number of response posts made by the response poster and a second column to contain a number of response posts associated with a status.

A response poster may be correlated with multiple statuses. For example, a response poster may have strong correlations with technical questions and urgent questions. If a response poster is associated with contrasting statuses, the degree of the correlation and/or the degree of the status may determine which status should be applied to the response poster. For example, if the response poster has responded to threads confirmed to be urgent as well as threads confirmed to be non-urgent, the response poster may be given a potential thread status of urgent, unless the response poster has a greater correlation with non-urgent threads. The correlation strength may be determined by a rating threshold or other comparisons, such as comparison of frequency tables of other posters.

The status engine 104 may represent any combination of circuitry and executable instructions configured to maintain a potential thread status of a thread of the forum. The status engine 104 may maintain the potential thread status based on the thread history. For example, the status engine 104 may maintain the potential thread status based on the correlation rating derivable from the thread history associated with a response poster. For another example, the status engine 104 may maintain the potential thread status based on the correlation rating of a response poster and a status threshold. The thread may be associated with the response poster and the correlation rating may be used to determine the status of the thread. For example, the thread may contain a response post associated with the response poster and the correlation rating of the response poster may be used to mark the thread with a potential thread status when the correlation rating achieves the status threshold. A status of a thread may be similar or associated with the status of a response poster. For example, a thread may be given a potential thread status of urgent if the correlation rating of the response poster is very high for urgency and the urgent status threshold is high.

The status threshold may represent a degree of correlation or a number of response posters having the correlation rating to achieve the potential status level. The status threshold may be a maximum value, a minimum value, or a range of values to achieve a status. For example, the threshold may be based on a number of threads, a number of posts, a number of posters, or any other data associated with the forum capable of being used to determine a status. The threshold may be directly or indirectly related to the status. For example, a thread may be marked as urgent when a sufficient number of response posters having a correlation with urgent threads post to the thread. For another example, a thread may be marked as important when a response poster posted a response post on the thread and the response poster has a correlation with posts including technical responses.

A thread may be associated with multiple statuses. For example, a thread may have response posters that have strong correlations with technical questions and response posters that have strong correlations with urgent questions. If a thread is associated with contrasting statuses, the degree of the correlation and/or the degree of the status may determine which potential status should be applied to the thread. For example, if the thread has been responded to by a first response poster having an urgent status correlation rating as well as a second response poster having a non-urgent correlation rating, the thread may be given a potential thread status of urgent, unless the second response poster has a stronger correlation with non-urgent threads than the correlation of the first response poster with urgent threads. The stronger potential thread status may be determined using a status threshold and/or a frequency table.

The pool engine 106 may represent any combination of circuitry and executable instructions to maintain an inspection pool based on a potential thread status. The inspection pool may contain a thread for review, or other form of inspection, based on the potential thread status. For example, a thread may be placed in the inspection pool when the thread receives a potential thread status of urgent. Maintaining a pool of threads for inspection based on a potential thread status may increase efficiency of inspecting a forum. For example, experts may have limited resources and/or may desire to review urgent threads prior to non-urgent threads. In that example, the pool may be maintained with potentially urgent threads or the pool may begin with the entire forum and potentially non-urgent threads may be removed; either implementation may reduce the pool for an expert to review and thereby, reduce and/or effectively use the resources allocated to reviewing the forum.

The status of a thread may presentable to a person for review. For example, the thread may appear as having a certain potential status when displayed during a request for thread review. The status of a thread may be updated once review occurs. For example, the thread may appear having a confirmed status when displayed once the thread has been reviewed.

The pool engine 106 may be configured to add threads and/or remove threads based on the potential thread status. For example, the pool engine 106 may be configured to at least one of add a thread to the inspection pool when the potential thread status is unknown and remove the thread from the inspection pool when the potential thread status is non-urgent.

The pool engine 106 may be configured to maintain a second pool, such as a verification pool. An implementation including multiple rules may allow for groups of threads to be reviewed based on a degree of status. An implementation using a verification pool may allow for threads to be removed from the inspection once a thread is confirmed to have a status. For example, the pool engine 106 may be configured to at least one of add a thread to a verification pool when the potential thread status is urgent and remove the thread from the inspection pool when the thread receives a confirmed thread status.

The correlation rating and/or the status threshold may be adjusted to maintain the size of a pool maintained by the pool engine. For example, if the inspection pool is greater than the resources available to allocate to inspection, then status threshold may be adjusted to decrease the inspection pool size. Correlation rating and/or status threshold adjustment is discussed in more detail in conjunction with an accuracy engine 308 of FIG. 3 and in conjunction with FIG. 7.

The data store 110 may contain information related to the system 100 and/or engines 102, 104, and 106. For example, a frequency table associated with a response poster may be stored in the data store 110. The data store 110 may store data associated with a forum, a thread, a post, a poster, a status, a rating, a threshold, a pool, or any other data mentioned herein.

FIG. 2 depicts that the example system 200 for inspecting a forum may be implemented on a memory resource 230 operatively coupled to a processor resource 232. The processor resource 232 may be operatively coupled to a data store 210. The data store 210 may be the similar to the data store 110 of FIG. 1.

Referring to FIG. 2, the memory resource 230 may contain a set of instructions that may be executable by the processor resource 232. The set of instructions may implement the system 200 when executed by the processor resource 232. The set of instructions stored on the memory resource 230 may be represented as a poster module 202, a status module 204, and a pool module 206. The processor resource 232 may carry out the set of instructions to execute the poster module 202, the status module 204, the pool module 206, and/or any appropriate operations between or associated with the modules of the system 200. For example, the processor resource 232 may carry out a set of instructions to maintain a correlation rating of a response poster based on a thread history, maintain a potential thread status of a thread based on the correlation rating, and maintain an inspection pool based on the potential thread status. The poster module 202, the status module 204, and the pool module 206 may represent program instructions that when executed function as the poster engine 102, the status engine 104, and the pool engine 106 of FIG. 1, respectively.

The processor resource 232 may be one or multiple CPUs capable of retrieving instructions from the memory resource 230 and executing those instructions. The processor resource 232 may process the instructions serially, concurrently, or in partial concurrence, unless described otherwise herein.

The memory resource 230 and the data store 210 may represent a medium to store data utilized by the system 200. The medium may be any non-transitory medium or combination of non-transitory mediums able to electronically store data and/or capable of storing the modules of the system 200 and/or data used by the system 200. A storage medium, such as memory resource 230, may be distinct from a transmission medium, such as a signal. The medium may be machine-readable, such as computer-readable. The data of the data store 210 may include representations of forums, threads, posts, posters, frequency counts, ratios, thresholds, and/or other data and/or information mentioned herein.

In the discussion herein, engine 102, 104, and 106 of FIG. 1 and the modules 202, 204, and 206 of FIG. 2 have been described as a combination of circuitry and executable instructions. Such components may be implemented in a number of fashions. Looking at FIG. 2, the executable instructions may be processor executable instructions stored on the memory resource 230, which is a tangible, non-transitory computer readable storage medium, and the circuitry may be electronic circuitry, such as processor resource 232, for executing those instructions. The processor resource 232, for example, may include one or multiple processors. Such multiple processors may be integrated in a single device or distributed across devices. For example in reference to FIG. 3, the processor resource 632 may be distributed across any combination of server devices 392 and client devices 394. The memory resource 230 may be said to store program instructions that when executed by the processor resource 232 implements the system 200 in FIG. 2. The memory resource 230 may be integrated in the same device as the processor resource 232 or it may be separate but accessible to that device and the processor resource 232. The memory resource 230 may be distributed across devices, such as server devices 392 and client device 394 of FIG. 3. The memory resource 230 and the data store 210 may represent the same physical medium unless otherwise described herein.

In one example, the program instructions may be part of an installation package that when installed may be executed by processor resource 232 to implement the system 200. In that example, the memory resource 230 may be a portable medium such as a CD, a DVD, a flash drive, or memory maintained by a server device, such as server device 392 of FIG. 3, from which the installation package may be downloaded and installed. In another example, the program instructions may be part of an application or applications already installed. Here, the memory resource 230 may include integrated memory such as a hard drive, solid state drive, or the like.

Figure 3:
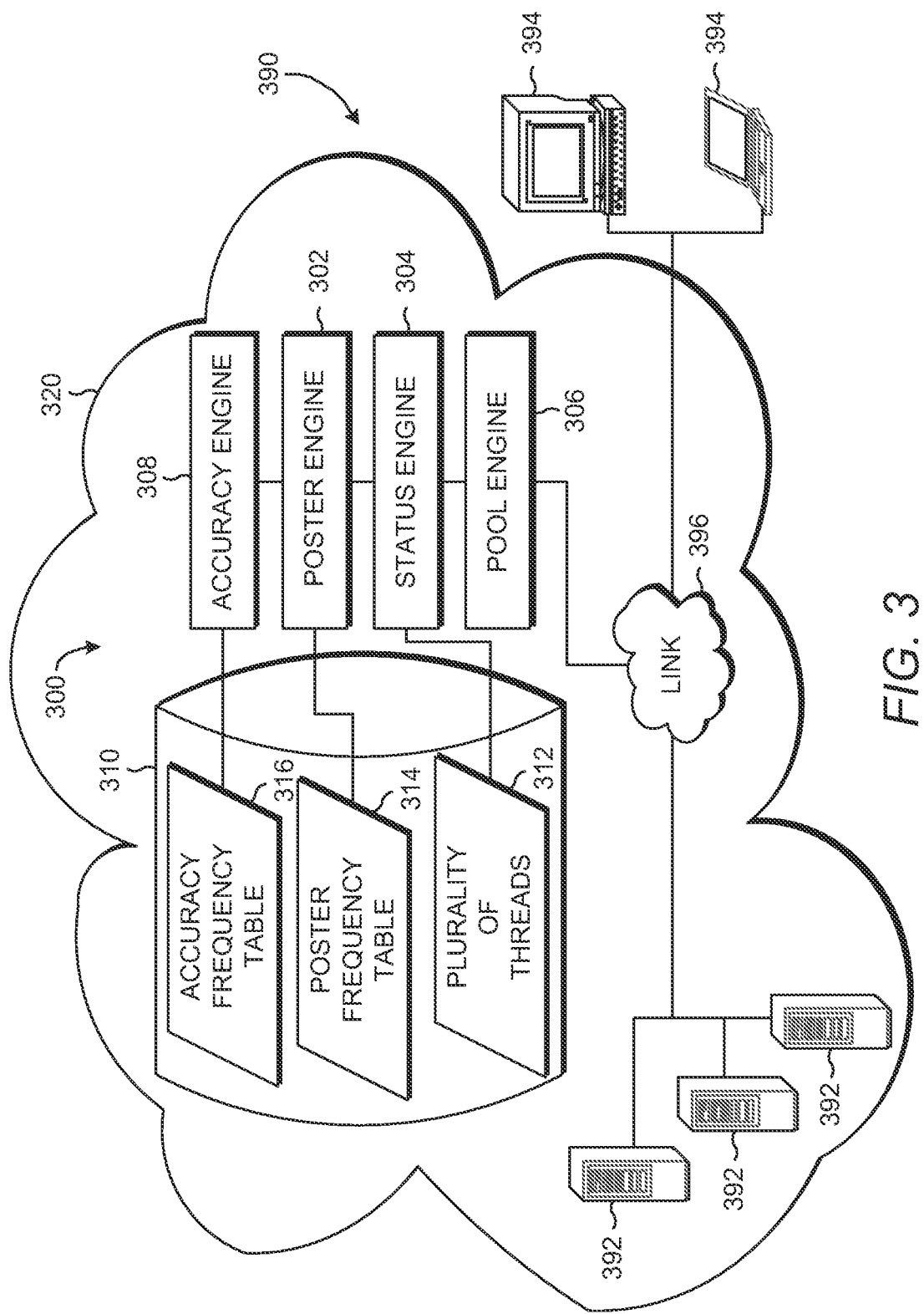
FIG. 3 depicts example environments in which various examples for inspecting a forum may be implemented.

FIG. 3 depicts example environments in which various examples for inspecting a forum may be implemented. The environment 390 is shown to include an example system 300 for processing an action. The system 300 (described herein with respect to FIGS. 1 and 2) may represent generally any combination of circuitry and executable instructions configured to inspect a forum. The system 300 may include a poster engine 302, a status engine 304, a pool engine 306, and a data store 310 that may be similar to the poster engine 202, the status engine 204, the pool engine 206, and the data store 210, respectively, and, for brevity, the associated descriptions are not repeated.

The system 300 may also include an accuracy engine 308. The accuracy engine 308 may represent any combination of circuitry and executable instructions configured to maintain a rating threshold and a status threshold. The rating threshold may represent a level of correlation achievable based on the thread history. For example, a medium urgent rating threshold may be achieved based on a thread history having a range of 60% to 80% of threads associated with the response poster to have an urgent status. The status threshold may represent a level of status based on a correlation rating of a response poster. For example, an urgent status threshold may be achieved when the correlation rating of a response poster is at least 90% where the 90% describes the amount of posts made by the response poster to urgent threads in relation to the amount of total posts of a response poster. The accuracy engine 308 may allow for the system 300 to react to changes in the forum and inspection constraints. A user may be allowed to configure thresholds and other data or policies implemented by the system 300. For example, marking all threads achieving the 90% status threshold may create a review pool that is too large relative to resource available for review and the status threshold may be increased to 95% by the user.

The accuracy engine 308 may be configured to maintain an accuracy frequency table 316. The accuracy frequency table 316 may be associated with at least one of the rating threshold and the status threshold. The accuracy frequency table 316 may contain a first column having a number of threads having a potential thread status associated with at least one of the rating threshold and the status threshold and a second column representing a number of threads having a confirmed thread status associated with the at least one of the rating threshold and the status threshold. The accuracy frequency table 316 may be used by the accuracy engine 308 to modify at least one of the rating threshold and the status threshold based on a first number of threads having a potential thread status and a second number of threads having a confirmed thread status. For example, the accuracy engine 308 may determine an accuracy of the system 300 is low in determining potentially urgent threads and at least one of the rating threshold and the status threshold may be adjusted accordingly.

The engine 302, 304, 306 and/or 308 may maintain a poster frequency table 314 and/or a plurality of threads 312. For example, the status engine 304 may update the plurality of threads 312 to a potential thread status, the pool engine 306 may remove a thread from the plurality of threads 312 when the thread receives a confirmed thread status, and the accuracy engine 308 may update the poster frequency table 314 when a thread is confirmed to be urgent. The data store 310 may be accessible by the engines 302, 304, 306, and 308 and the data store 310 may include a plurality of threads 312, a poster frequency table 314, and an accuracy frequency table 316.

The system 300 may be integrated into a server device 392 or a client device 394. The system 300 may be distributed across server devices 392, client devices 394, or a combination of server devices 392 and client devices 394. The environment 390 may include a cloud computing environment, such as a cloud network 320. For example, any appropriate combination of the system 300, server device 392, and client devices 394 may be a virtual instance and/or may reside and/or execute on a virtual shared pool of resources described as a "cloud." The cloud network 320 may include any number of clouds.

In the example of FIG. 3, a client device 394 may access a server device 392. The server devices 392 may represent generally any computing devices configured to respond to a network request received from the client device 394. For example, a server device 392 may be a virtual machine of the cloud network 320 providing the service and the client device 394 may be a computing device configured to access the cloud network 320 and receive and/or communicate with the service. A server device 392 may include a web server, an application server, or a data server, for example. The client devices 394 may represent generally any computing devices configured with a browser or other application to communicate such requests and receive and/or process the corresponding responses. A link 396 may represent generally one or any combination of a cable, wireless, fiber optic, or remote connections via a telecommunications link, an infrared link, a radio frequency link, or any other connectors of systems that provide electronic communication. The link 396 may include, at least in part, intranet, the Internet, or a combination of both. The link 396 may also include intermediate proxies, routers, switches, load balancers, and the like.

Referring to FIGS. 1-3, the engines 102, 104, 106, and 108 and/or the modules 202, 204, 206, and 208 (represented as engines 302, 304, 306, and 308 of FIG. 3) may be distributed across server devices 392, client devices 394, storage mediums, or a combination thereof. The engines and/or modules may complete or assist completion of operations performed in describing another engine and/or module. For example, the pool module 406 of FIG. 4 may request and/or complete the operations and/or perform the methods of the pool module 406 as well as the poster module 402, the status module 404, and the accuracy module 408. The engines and/or modules may perform the example methods described in connection with FIGS. 5-7.

Figure 4:
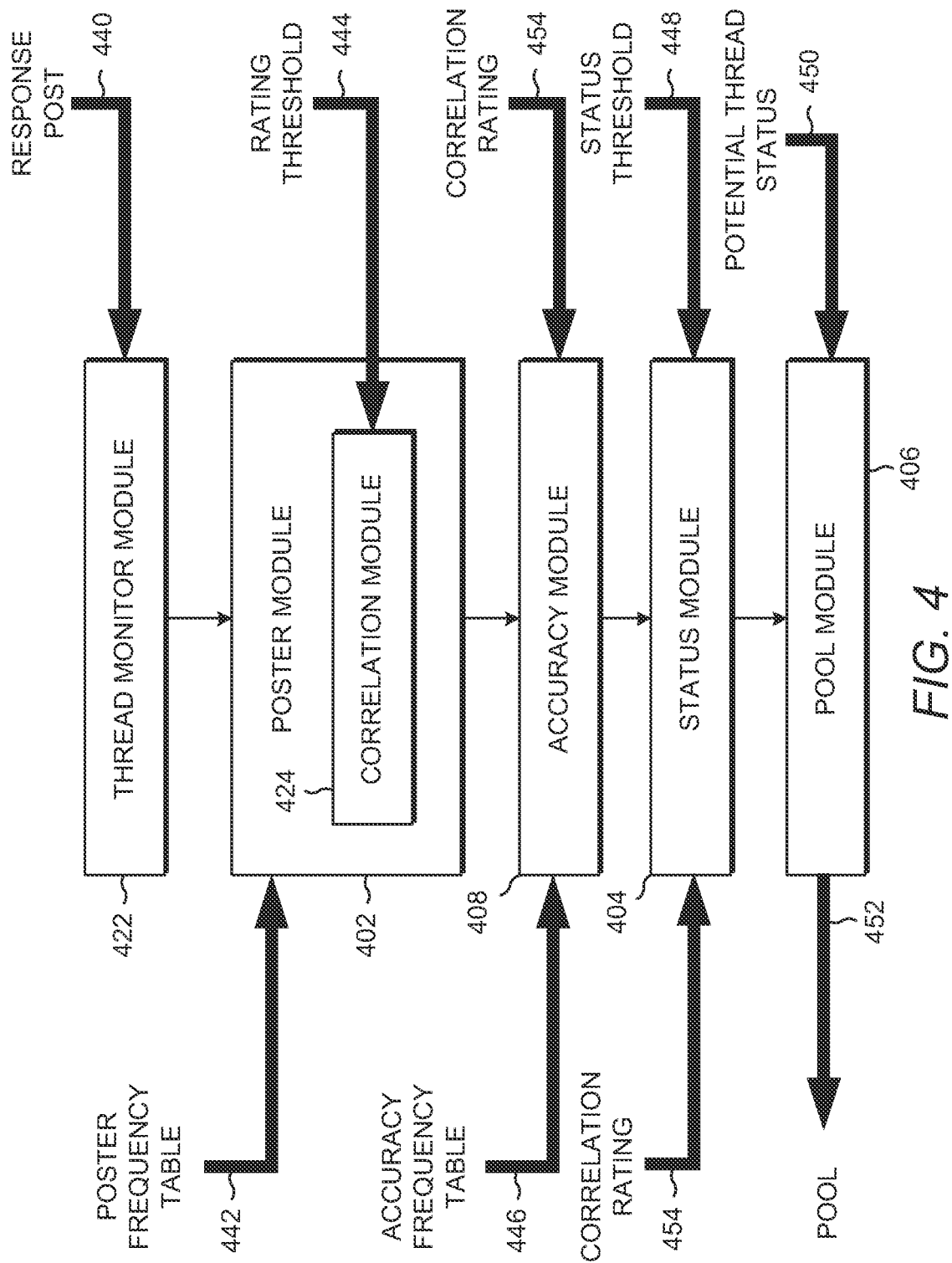
FIG. 4 is a block diagram of example modules used to implement example systems for inspecting a forum.

FIG. 4 is a block diagram of example modules used to implement example systems for inspecting a forum. The example modules of FIG. 4 may include a thread monitor module 422, a poster module 402, a correlation module 424, an accuracy module 408, a status module 404, and a pool module 406 which may be similar to modules and/or engines discussed herein. For example, The pool module 406 may be similar to pool engines 106, 306 and/or pool module 206.

Referring to FIG. 4, the system may monitor a thread, track a response post 440, determine a potential thread status 450 based on the response post 440, and retrieve a pool 452 for inspection. For example, the pool 452 may contain threads having a potential thread status 450 determined based on the correlation rating 454 associated with the response poster that originated the response post 440. A response post 440 may be made on a thread, such that the thread monitor module 422 may recognize the thread has been updated.

The thread monitor module 422 after receiving an event associated with the response post 440, such as creating the response post 440, may initiate the poster module 402 to discover the correlation rating 454 associated with the response poster of the response post 440. The poster module 402 may discover the response poster has already responded to the thread and return the known correlation rating 454 to the status module 404. For example, the poster module 402 may retrieve the correlation rating 454 and/or a poster frequency table 442 from the data store to obtain the correlation rating 454. The poster module 402 may initiate the correlation module 424 to retrieve a thread history associated with the response poster. For example, the correlation module 424 may receive a frequency table, such as the poster frequency table 314 of FIG. 3, containing the number of threads and the status associated with each thread. The correlation module 424 may calculate the correlation rating 454 based on the thread history associated with the response poster. For example, the thread history may include a poster frequency table 442 to track each posting and an associated thread and the correlation rating 454 may change as the response poster makes a post. For another example, a correlation rating 454 may be kept for each response poster based on the status of a thread or based on a group membership of the response poster.

Calculations and/or other operations to obtain the correlation rating 454 may use a rating threshold 444. The rating threshold 444 may be used to determine when the correlation rating 454 achieves a threshold associated with a degree of correlation and/or degree of a status. For example, a calculation based on the poster frequency table 442 may be compared to the rating threshold 444, and, if the calculation achieves the rating threshold 444, a corresponding correlation rating 454 may be associated with the response poster.

The correlation rating 454 of the response poster may be verified by the accuracy module 408 and/or the accuracy frequency table 446 may be updated according to the correlation rating 454 attributed to the response poster. For example, the accuracy frequency table 446 may track potential thread statuses, such as potential thread status 450, and confirmed thread statuses to verify the system's accuracy.

The correlation rating 454 may be sent to the status module 404 to determine an adjustment of the potential thread status 450, continue with the same potential thread status 450, or other operation to maintain the potential thread status 450 of the thread that received a response post 440. The potential thread status 450 may be directly correlated to the correlation rating 454. For example, if the response poster has received a correlation rating 454 of urgent, then the status module 404 may determine the thread may be marked as potentially urgent. The status module 404 may utilize a status threshold 448 to determine the potential thread status 450. For example, the thread may be given a potential thread status 450 when the status threshold 448 requests more than two response posters that posted on the thread have correlation ratings 454 of urgent, and the potential thread status 450 may not change if only one response poster associated with the thread has a correlation rating 454 of urgent. The thread may be added or removed from a pool 452 based on the potential thread status 450. The pool 452 may be provided for inspection.

As mentioned in the description of FIG. 3, the modules 402, 404, 406, 408, 422, and 424 may be located in a server device 392, a client device 394, or a combination of server devices 392 and client devices 394. For example, the pool module 406 may be located on a computer readable storage medium located in a web server for providing a message board service.

Figure 5:
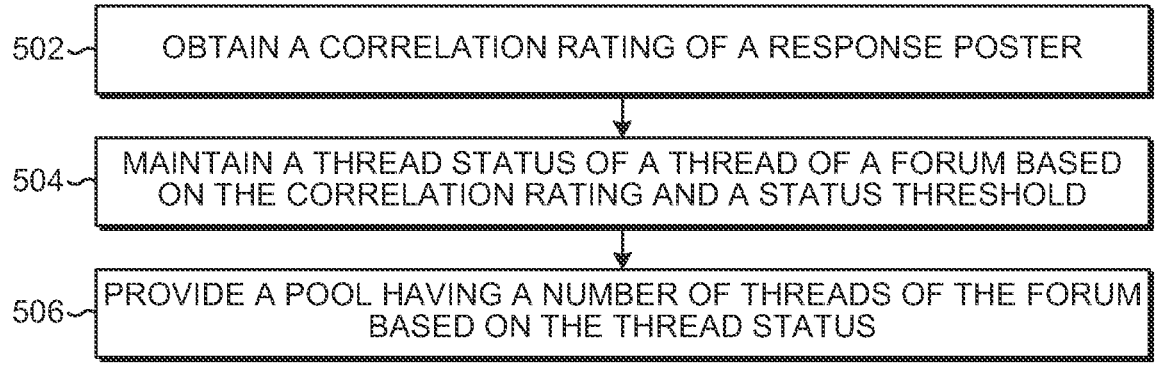
FIGS. 5-7 are flow diagrams depicting example methods for inspecting a forum.
Figure 6:
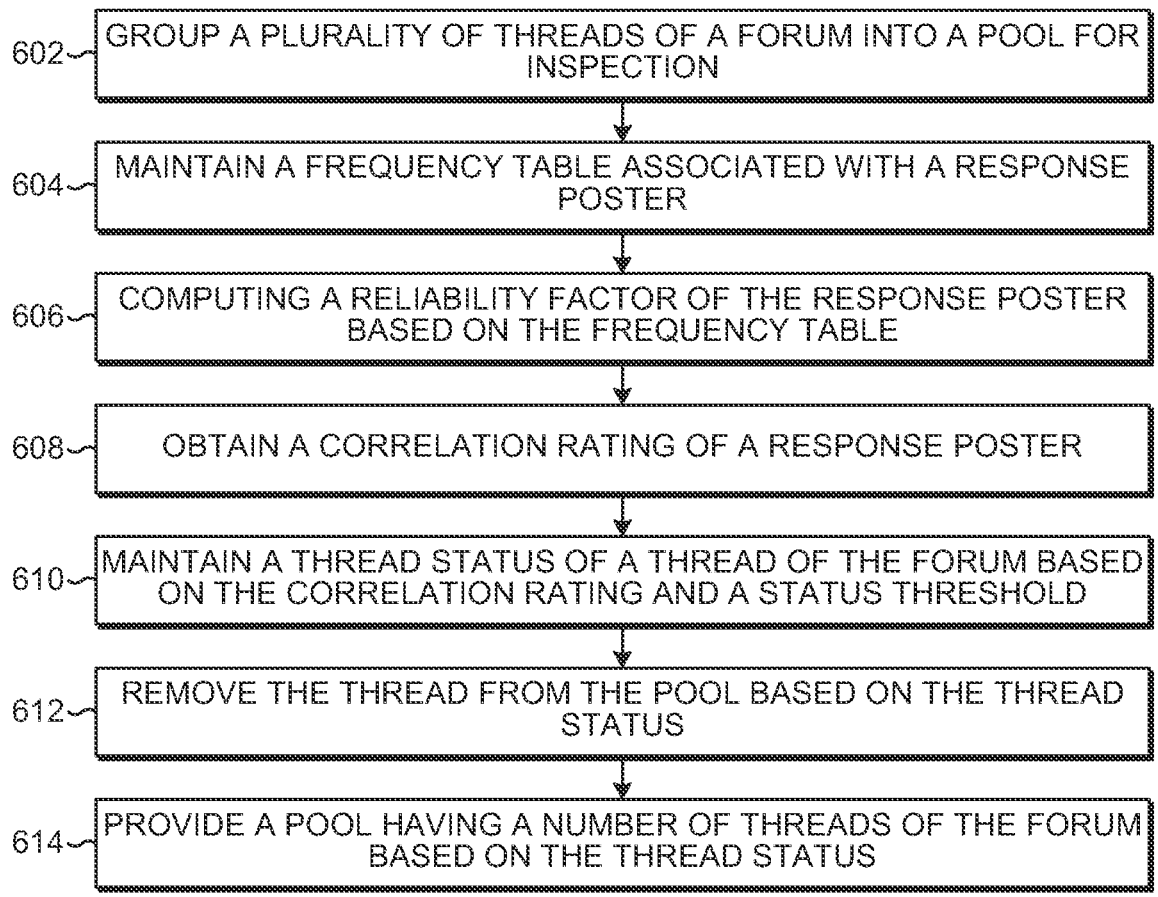
Figure 7:
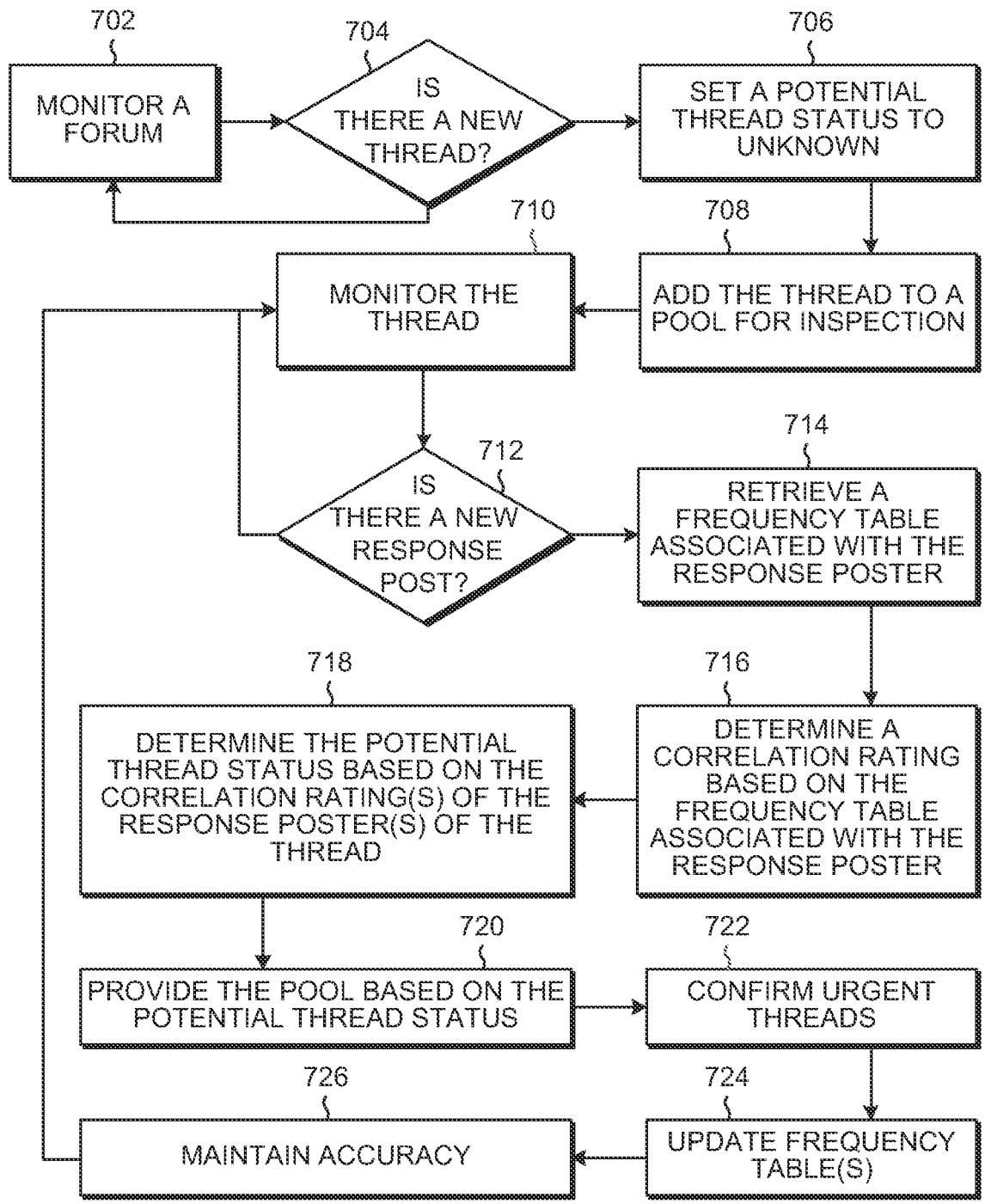

FIGS. 5-7 are flow diagrams depicting example methods for inspecting a forum. Referring to FIG. 5, example methods for inspecting a forum may generally comprise obtaining a correlation rating of a response poster, maintaining a thread status of a thread based on the correlation rating and a status threshold, and inspecting a pool having a number of threads of the forum based on the thread status.

At block 502, a correlation rating of a response poster may be obtained. As mentioned earlier, the response poster may be associated with a thread for which a potential thread status may be determined. The correlation rating may represent whether the response poster is associated with a first number of threads of the forum and the first number of threads may have a thread status to achieve a rating threshold. The rating threshold may include any value, category, or label achievable by a calculation based on the thread status of threads of a forum. For example, the first number of threads of the forum may have a confirmed thread status associated with urgency and the response poster may be correlated with an urgent status. The correlation rating may be obtained by a poster engine or module, such as poster engines 102 and 302 or poster modules 202 and 402 of FIGS. 1-4.

The correlation rating may be maintained based on the thread history. The thread history may be located in a data store, such as data stores 110, 210, and 310 of FIGS. 1-3. The correlation rating may be directly related to a thread status of a thread history. For example, the correlation rating may be maintained as non-urgent based on a thread status of a thread history being non-urgent. A correlation rating based on urgency may allow for appropriate pools to be formed, maintained, and inspected for effective and/or efficient use of review resources.

At block 504, a thread status of a thread of a forum may be maintained based on a correlation rating of a response poster and a status threshold. The forum may be located on a server device 392 of FIG. 3, such as a webserver. The thread may include a response post associated with the response poster. The thread status may represent a potential status level of the thread. For example, the potential status level may be related to a level of urgency, the response poster may have a non-urgent status correlation rating, and the correlation rating may indicate the thread may have a potential thread status of non-urgent. The thread status may be maintained as response posts are made to the thread. In conjunction with the previous example, if a second response poster makes a response post to the thread and the second response poster has an urgent status correlation rating, then the potential thread status may be adjusted to urgent from non-urgent. The correlation rating may be compared to the status threshold to determine if a potential thread status is achieved. Multiple correlation ratings may be used in the determination of the potential thread status. For example, if three response posters are associated with the thread, the three correlation ratings associated with the response posters may be used to determine the potential thread status, such as by combining the correlation ratings and comparing the combination to a status threshold. The potential thread status may be associated with or the same as the correlation rating held by the response poster. For example, the potential thread status may be maintained as non-urgent based on the correlation rating of an associated response poster being non-urgent. The thread status may be maintained by a status engine or module, such as status engines 104 and 304 or status modules 204 and 404 of FIGS. 1-4.

At block 506, a pool having a number of threads of the forum may be provided based on the thread status. The pool may be provided for inspection based on the thread status. For example, a pool may have a number of threads having an urgent thread status and that pool may be chosen for review based on the pool having threads of potentially urgent nature. Grouping the threads of a forum into a pool and maintaining the pool based on urgency may allow for inspection resources to be used efficiently. For example, an expert may have limited resources and may desire to focus on emergency problems, but may be unable to do so based on the words of a post; the expert may use the pool maintained based on the correlation rating and may be more likely to review the type of posts desired by the expert. The pool may be maintained by a pool engine or module, such as pool engines 106 and 306 or status modules 206 and 406 of FIGS. 1-4.

FIG. 6 includes similar blocks as FIG. 5 and provides additional blocks and additional details. In particular, FIG. 6 depicts additional blocks and details generally regarding grouping threads and maintaining the pool and/or the parameters for grouping the threads in the pool. The blocks 608, 610, and 614 of FIG. 6 are similar to blocks 502, 504, and 506 of FIG. 5, respectively, and, for brevity, the associated descriptions are not repeated.

At block 602, a plurality of threads of a forum may be grouped into a pool for inspection. The grouping may be based on a thread status. For example, the plurality of threads may each have a similar potential thread status. A confirmation status may be used with the pool. For example, the plurality of threads may have a confirmation status of unconfirmed. For another example, the pool may include all the threads of the forum that may not have a confirmed thread status or have some other reason to be inspected, such as a the original post of the thread has changed.

At block 604, a frequency table associated with a response poster may be maintained. For example, a frequency table may be updated has response posts are made on the plurality of threads. The frequency table may be maintained to represent a number of threads having a status based on an associated response poster. For example, the frequency table may track the number of confirmed urgent threads on which the response poster has posted. The frequency table may include a column to represent a total number of threads associated with the response poster and a column for a status to represent the number of threads associated with the response poster having a particular status. For example, the frequency table may include a first column to represent a number of threads responded to by the response poster and a second column to represent a number of threads responded to by the response poster and having a thread status confirmed to be urgent.

At block 606, a reliability factor of the response poster may be computed based on the frequency table. The reliability factor may be the result of a calculation to be used to determine a categorical correlation rating and the reliability factor may be converted to the correlation rating based on the rating threshold. For example, a frequency table may include seven of ten posts made by a response poster are made on urgent threads, the reliability factor may be computed as 70%, and the status threshold of 80% may determine that the response poster is correlated with non-urgent threads because the status threshold is not met. For another example, the reliability factor may determine a degree of correlation, such as a response poster above may have a 70% likelihood of posting on an urgent thread.

At block 612, a thread may be removed from the pool based on the thread status. For example, a thread in a pool of threads may be strongly correlated with non-urgent status based on a response poster of the thread and may be removed from an inspection pool for urgent threads. Trimming the pool may provide a conservative form of maintenance to ensure that potentially urgent threads are not overlooked.

FIG. 7 includes similar blocks as FIGS. 5 and 6 and provides additional blocks and additional details. In particular, FIG. 7 depicts additional blocks and details generally regarding an example method including maintaining a pool of potentially urgent threads in a forum for review.

At block 702, a forum may be monitored for activity. In particular, a forum may be monitored for creation of a new thread at block 704. The forum may be located on a server device, such as server device 392 of FIG. 3. A monitor module or device may be attached to the server device or other configuration capable of tracking the forum. When a new thread is created from a client device, such as client device 394 of FIG. 4, a potential thread status of the thread may be set to unknown by the server device at block 706 until a response has been posted to the thread. The new thread may be added to a pool for inspection at block 708. The pool may be located on the same server device as the forum or a separate server device. The inspection pool may be available for retrieval by a client device and review at any appropriate time. Multiple pools may be maintained to assist review of the forum. For example, a separate pool may be made for new threads and/or threads that have a potential thread status of unknown.

At block 710, the thread may be monitored for activity. In particular, the thread may be monitored for responsive posts to the original post of the thread at block 712. When a response post is made, a frequency table may be retrieved from a data store that is associated with the poster of the response post at block 714. The frequency table may include data related to a correlation rating and/or a status of a thread. The frequency table may be filled with data based on a set of history data of the response poster. The set of history data may be associated with the thread status of a number of threads previously responded to by the response poster. For example, the set of history data may be related to other threads of the forum or another forum.

The frequency table of the response poster may be filled based on a second frequency table of a second response poster. For example, the first response poster may not have enough data to determine an urgency status, but may be strongly correlated with second poster who has a correlation rating. Filling a frequency table of a first response poster based on the frequency table of a second response poster may be useful when the first response poster has not previously responded in the forum or responded a sufficient number of times to create a reliable correlation rating.

At block 716, a correlation rating of a response poster may be determined based on the frequency table associated with the response poster. The correlation rating may be determined by comparison and/or calculation, such as dividing a number of threads having a response post of the response poster that also have an urgent thread status by the total number of threads having a response post of the response poster.

At block 718, the potential thread status of the thread may be determined based on the correlation rating of the response poster of the thread. For example, the thread may be given a non-urgent status if the response poster has a correlation rating of non-urgent based on the response poster's thread history. The determination of the potential thread status may be based on multiple correlation ratings. For example, the potential thread status may be determined based on the correlation rating of each of the response posters of the thread.

At block 720, a pool may be provided based on the potential thread status. A reviewer may inspect the pool based on the potential thread status. For example, the reviewer may request a plurality of threads from the forum using a client device, such as client device 394 of FIG. 3, and the plurality of threads of the pool may be retrieved form a server device, such as server device 392 of FIG. 3. The reviewer may than inspect each thread and determine whether the thread has the potential thread status or should be given another status. For example, the reviewer may individually review the plurality of threads and determine that a thread of the plurality of threads is non-urgent, even though it had been marked as potentially urgent. The reviewer may confirm the status of the thread based on inspection at block 722. For example, the reviewer may confirm the status of the thread is urgent and an expert may be provided with a link to the thread or a copy of the thread to determine a review and/or response to the urgent post.

Once a thread has received a confirmed thread status, a frequency table may be updated with a confirmation status at block 724. For example, the frequency table associated with each response poster may be updated to improve the correlation rating of the response poster. At block 726, the accuracy of the system may be maintained based on the review of the plurality of threads. For example, the confirmed status and/or other data related to the thread may be sent to an accuracy engine or module, such as accuracy engine 308 of FIG. 3 or accuracy module 408 of FIG. 4. An accuracy frequency table, such as accuracy frequency table 316 of FIG. 3, a rating threshold, and/or a status threshold may be updated based on the inspection of the pool of threads. For example, at least one of a rating threshold and a status threshold may be changed to improve the accuracy of the system if an inaccuracy threshold is met based on the difference between the potential thread status and the confirmed thread status of the plurality of threads in the pool.

Although the flow diagrams of FIGS. 5-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing examples. It is understood, however, that other forms, details, and examples may be made without departing from the spirit and scope of the invention that is defined in the following claims.

What is claimed is:

1. A system for inspecting a forum, comprising:
a processor; and
a memory communicatively coupled to the processor, wherein the memory stores instructions that when executed by the processor cause the processor to provide a forum inspection function by executing: a poster engine functional module, a status engine functional module, and a pool engine functional module on the processor, the forum containing one or more threads, each of the one or more threads containing one or more original posts, as original entries in the forum, provided by a poster, and one or more response posts, provided by a response poster, each response post directly associated with at least one original entry, the one or more original posts and the one or more response posts provided asynchronously, the poster and response poster being different members of a community associated with the forum,
the poster engine functional module to maintain a thread history associated with a response poster, the response poster having responded to multiple original posts in a plurality of different threads, each response by the response poster used by the poster engine functional module to update the thread history associated with the response poster;
the status engine functional module to maintain a potential thread status of a first thread of the one or more threads of the forum, the potential thread status based on the thread history associated with the response poster, a correlation rating associated with the response poster, and responsive to a response post provided to the first thread by the response poster; and
the pool engine functional module to maintain an inspection pool based on the potential thread status, the inspection pool to contain the first thread for review by a reviewer, wherein responsive to review by a reviewer:
a status of the first thread is updated to a confirmed status instead of the potential thread status, and
the first thread is removed from the inspection pool.

2. The system of claim 1, wherein the pool engine functional module comprises instructions to at least one of:
add the first thread to the inspection pool when the potential thread status is unknown; and
remove the first thread from the inspection pool when the potential thread status is non-urgent.

3. The system of claim 1, wherein the pool engine functional module comprises instructions to at least one of:
add the first thread to a verification pool when the potential thread status is urgent; and
remove the first thread from inspection pool when the first thread receives a confirmed thread status.

4. The system of claim 1, wherein the poster engine functional module comprises instructions to maintain a first frequency table associated with the response poster based on a first number of response posts made by the response poster and a second number of response posts made by the response poster confirmed to be urgent.

5. The system of claim 4, wherein the forum inspection function further comprises an accuracy engine functional module, the accuracy engine functional module to:
maintain a rating threshold to represent a level of correlation achievable based on the thread history and a status threshold to represent a level of status based on a correlation rating;
modify at least one of the rating threshold and the status threshold based on a number of potentially urgent threads and a number of confirmed urgent threads, wherein the first thread is included in one of the number of potentially urgent threads or the number of confirmed urgent threads; and
update the first frequency table when the first thread is confirmed to be urgent.

6. A non-transitory machine readable storage medium comprising a set of instructions executable by a hardware processor resource to cause the hardware processor resource to:
maintain a forum containing one or more threads, each of the one or more threads containing one or more original posts, as original entries in the forum, provided by a poster, and one or more response posts, provided by a response poster, each response post directly associated with at least one original entry, the one or more original posts and the one or more response posts provided asynchronously, the poster and response poster being different members of a community associated with the forum,
maintain a correlation rating of the response poster based on a thread history associated with the response poster, the response poster having responded to multiple original posts in a plurality of different threads, each response by the response poster used to update the thread history associated with the response poster;
maintain a potential thread status of a first thread of the one or more threads of the forum based on the correlation rating, the first thread to include a response post associated with the response poster; and
maintain an inspection pool based on the potential thread status, the inspection pool to contain the first thread for review by a reviewer, wherein responsive to review by a reviewer:
a status of the first thread is updated to a confirmed status instead of the potential thread status, and
the first thread is removed from the inspection pool.

7. The non-transitory machine readable storage medium of claim 6, wherein the set of instructions is to at least one of:

add the first thread to the inspection pool when the potential thread status is unknown; and remove the first thread from the inspection pool when the potential thread status is non-urgent.

8. The non-transitory machine readable storage medium of claim 6, wherein the set of instructions is to at least one of:

add the first thread to a verification pool when the potential thread status is urgent; and remove the first thread from inspection pool when the first thread receives a confirmed thread status.

9. The non-transitory machine readable storage medium of claim 6, wherein the set of instructions is to maintain a first frequency table associated with the response poster based on a first number of response posts made by the response poster and a second number of response posts made by the response poster confirmed to be urgent.

10. The non-transitory machine readable storage medium of claim 9, wherein the set of instructions is to:

maintain a rating threshold to represent a level of correlation achievable based on the confirmed thread status and the status threshold to represent a level of status based on the correlation rating;

modify at least one of the rating threshold and the status threshold based on a number of potentially urgent threads and a number of confirmed urgent threads, wherein the first thread is included in one of the number of potentially urgent threads or the number of confirmed urgent threads; and update the first frequency table when the thread is confirmed to be urgent.

11. A computer-implemented method for inspecting a forum comprising:

obtaining, using a hardware processing device of a computer, a correlation rating of a first response poster providing one or more response posts to the forum, the correlation rating, maintained by instructions executed on the hardware processing device, to represent whether the first response poster is associated with a first number of threads of the forum, the first number of threads having a first thread status to achieve a rating threshold, each of the first number of threads containing one or more original posts, as original entries in the forum, provided by a poster, each response post directly associated with at least one original entry, the one or more original posts and the one or more response posts provided asynchronously, the poster and response poster being different members of a community associated with the forum;

maintaining, using the hardware processing device, a second thread status of a second thread of the forum based on the correlation rating and a status threshold, the second thread including a response post associated with the first response poster and the second thread status to represent a potential status level of the second thread based on attributes associated with the first response poster, the attributes independent of the second thread and the first thread; and providing an inspection pool having a second number of threads of the forum based on the second thread status, the inspection pool to contain the second number of threads for review by a reviewer.

12. The computer-implemented method of claim 11, further comprising:

executing a grouping operation on the hardware processing device to group a selection of threads of the forum into the inspection pool, the inspection pool used to select the second number of threads for review by a reviewer, the second number of threads having a confirmation status of unconfirmed and at least one of the second thread or the first thread being one of the second number of threads;

maintaining the correlation rating to non-urgent based on the first thread status being non-urgent, the correlation rating associated with urgency;

maintaining the second thread status as non-urgent based on the correlation rating being non-urgent; and responsive to review by the reviewer, removing each reviewed thread from the inspection pool.

13. The computer-implemented method of claim 11, further comprising:

maintaining, using the hardware processing device, a frequency table associated with the first response poster, the frequency table including:

a first entry to represent a third number of threads responded to by the first response poster; and a second entry to represent a fourth number of threads responded to by the first response poster and confirmed to be urgent.

14. The computer-implemented method of claim 13, comprising:

populating, using the hardware processing device, the frequency table with data based on a set of history data of the first response poster, the set of history data associated with the first thread status of the first number of threads previously responded to by the first response poster; and changing, using the hardware processing device, at least one of the rating threshold and a status threshold, the status threshold to represent a number of response posters having the correlation rating to achieve the potential status level, the potential status level associated with a level of urgency.

15. The computer-implemented method of claim 13, further comprising:

populating, using the hardware processing device, the frequency table of the first response poster based on a second frequency table of a second response poster, wherein the first response poster has not previously responded in the forum and is associated with the second response poster.

* * * * *